Dec. 11, 1923.

E. M. BELL

GEARLESS DIFFERENTIAL

Filed May 4, 1922

Inventor
Edward M. Bell
By Lancaster and Allwine
Attorneys

Dec. 11, 1923.

E. M. BELL 1,477,236

GEARLESS DIFFERENTIAL

Filed May 4, 1922

Inventor
Edward M. Bell
By Lancaster and A. Levine
Attorneys

Patented Dec. 11, 1923.

1,477,236

UNITED STATES PATENT OFFICE.

EDWARD M. BELL, OF MILL SPRING, NORTH CAROLINA.

GEARLESS DIFFERENTIAL.

Application filed May 4, 1922. Serial No. 558,441.

*To all whom it may concern:*

Be it known that I, EDWARD M. BELL, a citizen of the United States, residing at Mill Spring, in the county of Polk and State of North Carolina, have invented certain new and useful Improvements in Gearless Differential, of which the following is a specification.

This invention relates to an improved gearless differential.

The primary object of this invention is the provision of a novel type of gearless differential, operating upon the principle of the friction clutch, whereby power from a drive member may be effectively transmitted to a driven member, such as a wheel, for rotation of the latter in forward or reverse direction.

A further object of the invention is the provision of a friction clutch type of differential mechanism which may be utilized in connection with the propelling of motor vehicles, susceptible of attachment to vehicle wheels in order that power from an axle may be transmitted to the driven vehicle wheels, so that when the vehicle is taking a turn, the inside driven wheel may pull the load of the vehicle, by permitting the outside wheel to rotate faster; thus operating much in the same manner as the conventional type of gear differential, but not subject to the effect of the conventional gear differential, in its inability to properly transmit power to the driven wheels if the wheels have unequal traction.

A further object of this invention is the provision of a device for transmission of power from a drive to a driven member through a novel type of clutch mechanism, which includes an expansible device, for selective adjustment to engage the driven member, whereby the latter may be rotated in forward or reverse direction.

A further object of the invention is the provision of a novel type of friction drive mechanism, embodying a plurality of sets of clutch shoes, and an improved means for selectively positioning either of said sets of shoes into engagement with a driven member, so that the latter may be rotated in forward or reverse direction.

Other objects and advantages will of course be apparent during the course of the following detailed description.

In the accompanying drawings, forming a part of this specification, and wherein similar reference characters designate corresponding parts throughout the several views.

In the drawings, wherein for the purpose of illustration is shown the preferred and modified forms of this invention, the letter A designates the preferred form of gearless differential, adapted for use in connection with an axle or drive shaft B for the operation of a driven member C, such as a vehicle wheel. The improved gearless differential A preferably includes a clutch arrangement D and a shifting arrangement E. The modified form of differential F may likewise be used in connection with an axle or drive shaft G for the driving of the vehicle wheels H or the like. The modified form of mechanism F preferably includes the clutch arrangement J and shifting arrangement K.

Figure 1:
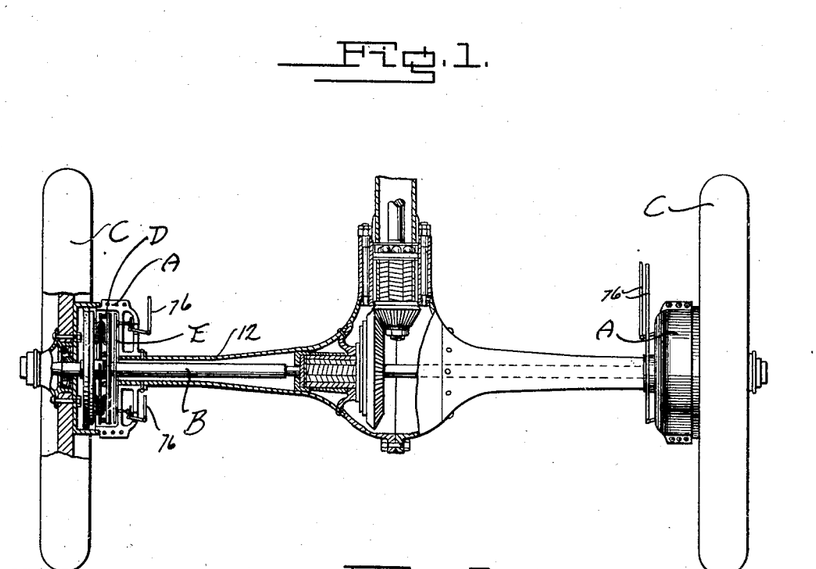
Figure 1 is a plan view, partly in section, of the rear portion of an automotive vehicle, showing the manner in which the improved device may be utilized in connection with vehicle wheels for driving the same from the power of a drive axle, in order to propel the vehicle.

The improved mechanism A may be used in connection with a motor vehicle, and in such instance the drive member B is the axle of the vehicle, and the driven members C will be the vehicle wheels mounted upon the spindle ends 10 of the drive shaft or axle B. It is preferred, that when so used, a complete mechanism A is mounted upon each of the vehicle wheels used, substantially as is illustrated in Figure 1 of the drawings. The ordinary axle housing 12 is, in such instance, provided for the drive shaft or axle B.

Referring to the clutch arrangement D of the improved gearless differential A, the same preferably includes a drum member 20 adapted for attachment as by bolts 21 to the driven member C. The annular flange 22 is provided as a part of the drum 20 extending outwardly from a side of the driven member C and having the drive member B axially disposed therethrough. A sleeve 25 is provided upon the drive shaft B as by keying at 26, said sleeve 25 having circumferential series of attaching ears 27 and 28 thereon for pivotally receiving arms 29 and 30 respectively. The arms 29 are all arranged in the same plane circumferentially about the drive shaft B, as are also the arms 30 arranged in a common plane about the shaft B. Any number of these arms 29 and 30 may be provided, and it is preferred that the free ends of the arms 29 and 30 pivotally receive segmental clutch shoes 32 and 33. Thus, the arm 29 has an arcuate shoe 32 pivoted on the free end thereof upon its concaved side to ears 36 which extend therefrom centrally of the ends of the arcuate shoe 32. Similarly, each of the arms 30 is pivoted upon the concaved side of a clutch shoe 33, as by ears 37 extending from said concaved side intermediate the ends of the shoe 33. The shoes 32 are provided upon their convex sides with brake lining material 38, and the proximate ends of adjacent shoes 32 are connected as by tension springs 40, so that the segmental shoes 32 are connected in circular formation adjacent the interior surface 41 of the drum flange 22. In this position, the arms 29 are all tangentially disposed with respect to the drive member B and the sleeve 25 attached thereto; said arms 29 all inclining in the same general direction circumferentially of the sleeve 25. The clutch shoes 33 of the arms 30 are each provided with linings 44 upon the convex sides thereof, and the approximate ends of adjacent shoes 33 are connected as by the tension springs 45, so that said segmental shoes 33 are arranged in ring like formation about the interior surface 41 of the drum flange 22. Thus, the clutch shoes 32 form one set of interconnected clutch members, while the shoes 33 form a second set of interconnected clutch members. The arms 30 are also tangentially disposed with respect to the drive shaft B and the sleeve 25 affixed thereon, all inclining in the same direction, and counter to the direction in which the arms 29 incline about the drive shaft B. It is preferred that there be an equal number of arms 29 and 30, disposed so that an arm 29 and its adjacent arm 30 are in X-shaped relation, as can readily be seen from Figures 2 and 3 of the drawings. Links 47 are provided for pivotal connection at their ends to adjacently positioned arms 29 and 30, so that said arms are cooperatively supported in X-shaped relation in order that the shoes 32 and 33 may cooperate in driving of the drum 20 both forwardly and in reverse direction, as will be hereinafter described.

Referring to the shifting arrangement E, the same includes a housing 50 which is fixedly mounted with respect to the driven drum 20, as upon the axle housing 12. A plurality of radial arms 52 are provided circumferentially about the sleeve 25, preferably being cast integral therewith. Each one of these radial arms 52 pivotally receives an attachment 54, which may be of wire bent into U-shaped formation, so that arms 55 and 56 are provided upon said attachments 54. A spring 57, preferably of the spiral type, is provided for each attachment 54, having the same attached at one end to the free end of the arm 55, and being attached at its other end to an arm 30 at the point of connection of a link 47 with said arm 30. Thus, an attachment 54 and a spring 57 cooperating therewith is provided for each pair of arms 29 and 30, for cooperating in such manner that the clutch shoes 32 and 33 may be controlled for selective engagement against the drum member 20.

In order to oscillate the attachments 54 so that the clutch shoes 32 and 33 may be selectively controlled, a shifting clutch mechanism 58 is provided for cooperation therewith, and which includes a plate 59 which is oscillatively mounted upon the drive member B. The plate 59 is preferably provided with radial slots 60 therein, one of said slots being provided for each attachment 54, and to receive a stem 61 upon the outer free end of the attachment arm 56; a nut 62 being provided for detachable engagement upon said stem 61, whereby the same may be retained in the slot 60. A relatively wide portion 63 of said slot 60 is provided for receiving said nut 62 in order to prevent detachment of the stem 61. Thus, each of the attachments 54 is slidably pivoted within a slot 60 of the clutch plate 59. A second plate 65 is preferably provided as a part of the clutch device 58, adapted for cooperating against a lined face 66 of the other plate 59. This plate 65 is preferably provided with detachable stems 67 which are reciprocably disposed in sockets 68ᵃ of the housing 50, whereby the plate 65 may be advanced longitudinally of the drive member B for frictional engagement with the plate 59. The plate 65 is, of course, prevented from rotational movement about the drive member B by means of the stems 67. Compression springs 68 are provided upon each of the stems 67 cooperating intermediate heads 69 of said stems and the partition 70 of the housing 50 in which the sockets 68ᵃ are disposed, so that the movable plate 65 is normally retained out of engagement with its cooperating clutch plate 59. Suitable bell crank levers 71 are pivoted as at 72 within the housing 50, having one arm 73 thereof adapted for cooperation against the head 69 of a plate stem 67, and having the other arm 74 extending outwardly of a recess 75 in the housing 50, to receive a control rod 76. The control rod 76 may lead to any suitable location. Cables may be substituted in lieu of the rods 76, whereby an operator may rock the bell crank levers 71 for forcing the plate 65 longitudinally of the drive member B into engagement with the friction lining 66 of the clutch plate 59.

Figure 2:
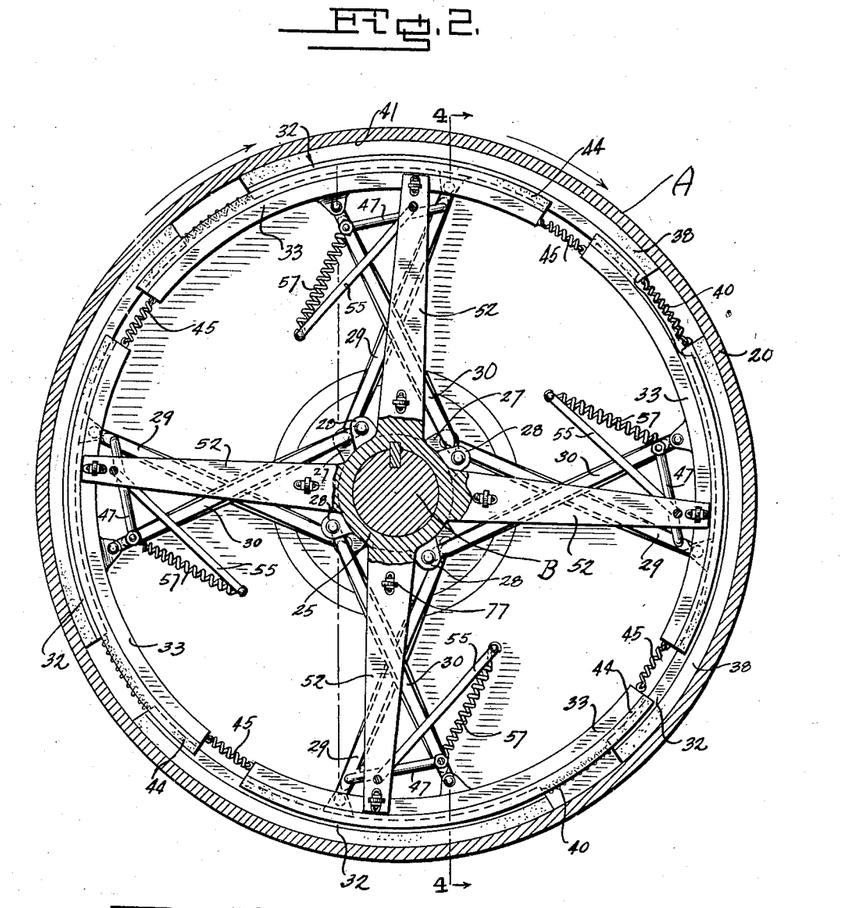
Figure 2 is a transverse cross sectional view, taken on the line 2—2 of Figure 4, and showing parts of the improved gearless differential in position for forward rotation of a driven member.
Figure 4:
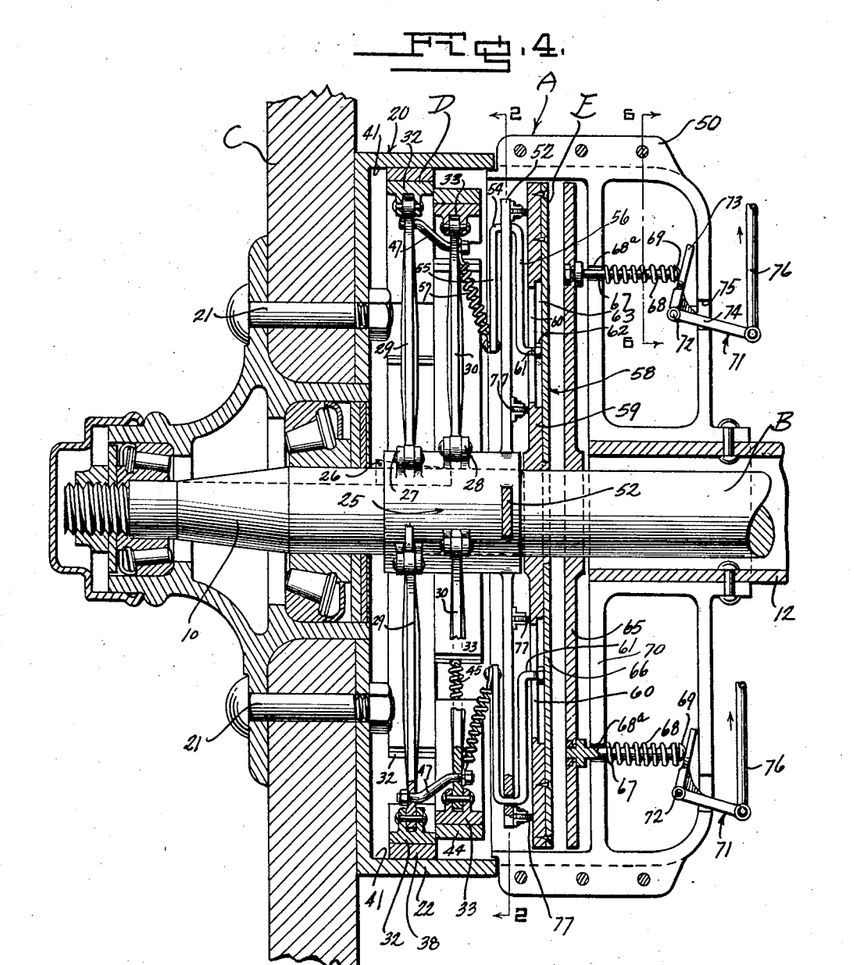
Figure 4 is a cross sectional view, taken through the improved gearless differential longitudinally of the drive shaft thereof, and taken on the line 4—4 of Figure 2.
Figure 5:
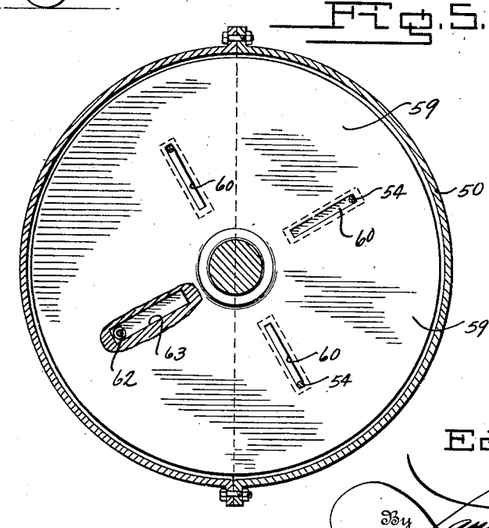
Figure 5 is a reduced cross sectional view taken through the improved gearless differential, showing several details thereof.
Figure 6:
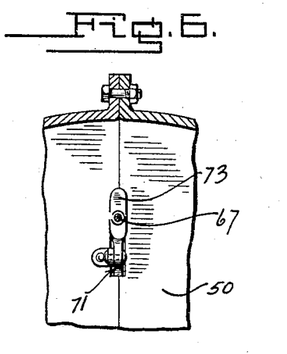
Figure 6 is a fragmentary cross sectional view taken on the line 6—6 of Figure 4.

In operating the preferred form of gearless differential, assuming the differential A to be in such position that the drive shaft B is rotating the wheel forwardly, as is illustrated in Figures 2 and 4. For such forward drive of the driven member C, the segmental shoes 32 which are pivotally attached to the tangential arms 29 are in engagement with the annular flange 22 of the drum 20. The sleeve 25 being rigidly keyed or otherwise secured to the shaft B will transmit the rotational force to the driven member C by reason of the fact that the shoes 32 are normally urged into engagement with the flange 22, because of the tangential relation which the arms 29 bear to the sleeve 25 and drive member B, as is obvious from the drawings. In this position, the springs 57 are under tension, whereby the same exert a pulling force upon the arms 30, tending to rock the same upon the ears 27 of the sleeve 25. The attachments 54, are, of course, held in a fixed relation, by reason of the stem ends 61, which are fixed in sliding relation within the slots 60, so that the effect of said springs 57 is to maintain the shoes 33 out of engagement with the drum flange 22. Due to the link connection 47, the arms 29 are held by the force of the springs 57, so that the segmental shoes 32 are, on the other hand, forced into engagement with the drum flange 22. In this manner, the attachments 54 and springs 57 associated therewith are provided for holding the clutch shoes 32 into engagement with the drum 20, and to retain the shoes 33 out of engagement therewith. The shoes 32 thus being locked, so to speak, with the drum 20 permit the driven member C to be operated through rotation of the drive member B, as can readily be understood. The force with which the springs 57 hold the shoes 32 in engagement with the drum flange 22 is not such a force as will prevent the drum or driven member C from rotating faster than the drive member B, as will be desirable in case the improved differential A is used for vehicle propelling purposes.

Figure 3:
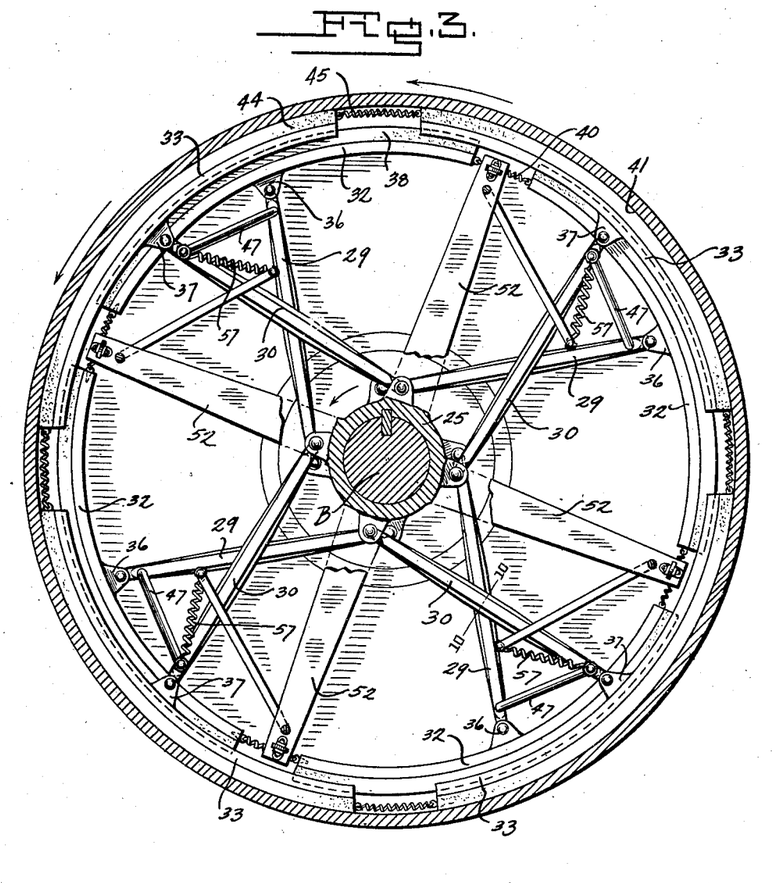
Figure 3 is a transverse cross sectional view, altogether similar to that illustrated in Figure 2, however, illustrating the details of the improved mechanism in position for reverse rotation of the driven member.

In driving the wheel or member C in reverse direction, as is illustrated in Figure 3 of the drawings, it is first necessary for the operator to rock the bell crank levers 71 so that the clutch plates 65 and 59 are held in engagement as above described. Such action will lock the plate 59 to the plate 65, and in effect hold the plate 59 rigid with the casing 50. However, as the drive member B is rotating in reverse direction, as is illustrated in Figure 3 of the drawings, the arms 52 will likewise move with the drive shaft B, and due to the slidable pivoting of the stem ends 61 of the attachments 54 in the clutch plate 59, said attachments 54 will be oscillatively moved in their supporting arms 52 so that the same will swing from one side of the arms to which they are attached to the other side, as can readily be seen from Figures 2 and 3 of the drawings. Such action will throw the springs 57 so that their force will hold the clutch shoes 33 into engagement with the drum flange 22, and throw the clutch shoes 32 out of engagement therewith. In this manner, the arms 29 and 30 are controlled by the attachments 54 and springs 57, so that an operator may, merely by holding the plates 59 and 65 into engagement, selectively place the clutch shoes 32 and 33 into engagement with the drum 20 for forward or reverse driving of the member C according to the forward or reverse rotation of drive shaft B. In order to stabilize the action of the clutch plate 59 and the arms 52, suitable roller members 77 may be provided upon said arms 52 for rolling contact with the side of the clutch plate 59.

Figure 7:
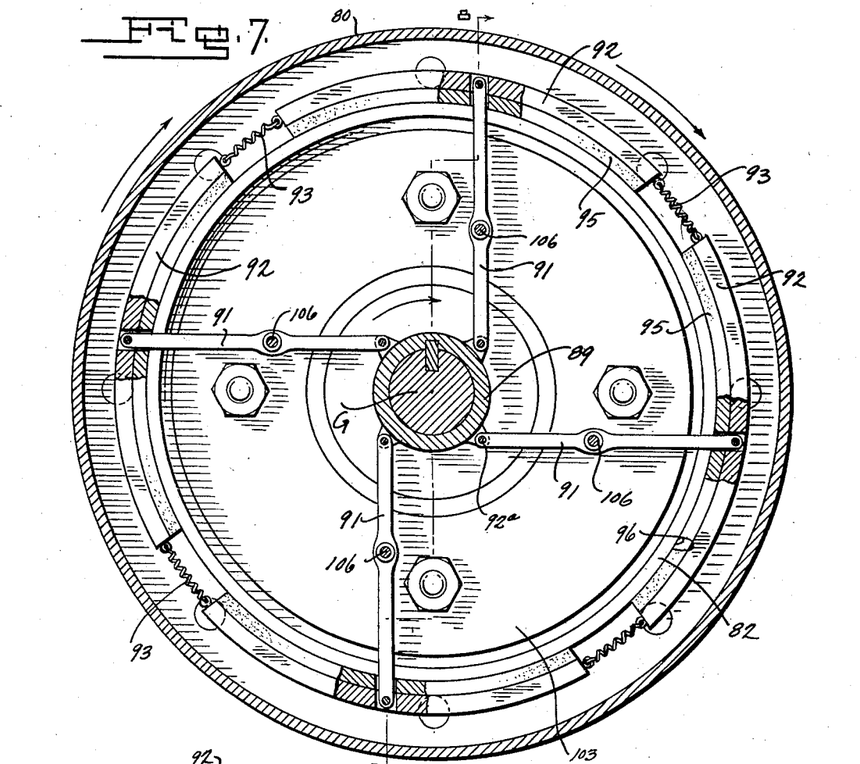
Figure 7 is a transverse cross sectional view through a modified form of this invention.
Figure 8:
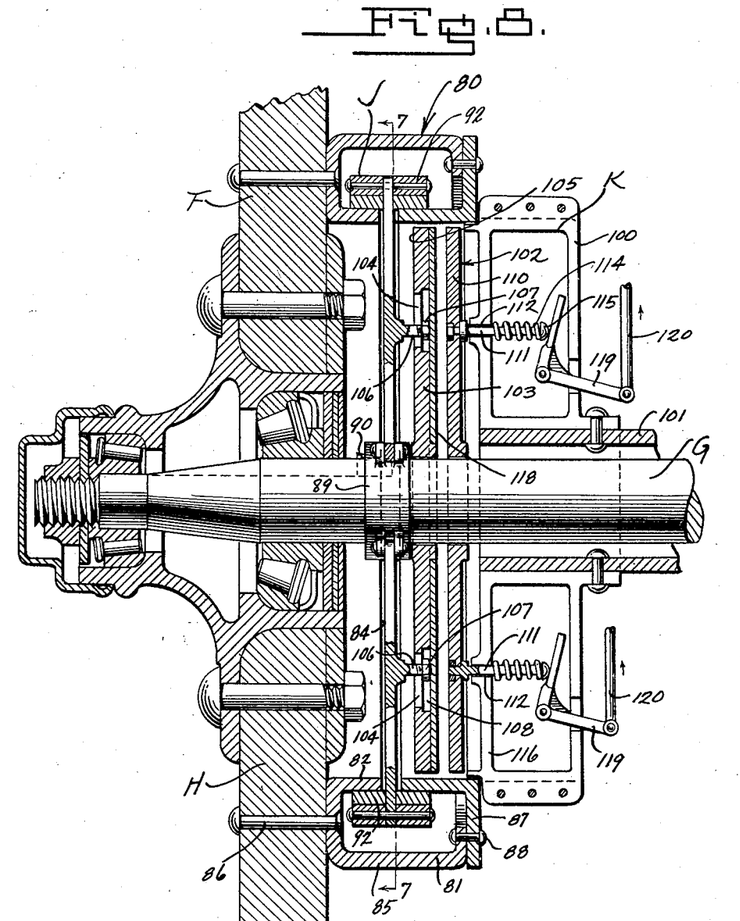
Figure 8 is a cross sectional view, taken on the line 8—8 of Figure 7, showing the co-operating parts of the modified form of the invention.
Figure 9:
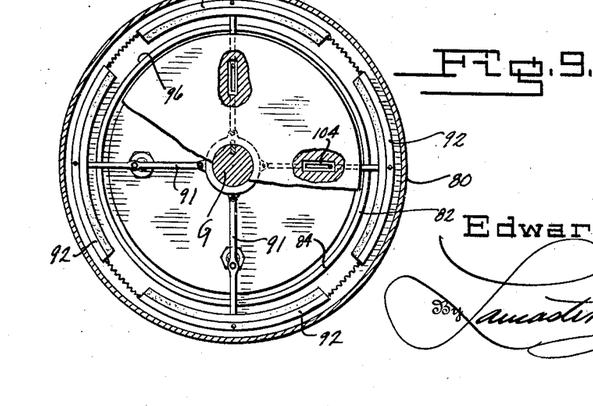
Figure 9 is a reduced transverse cross sectional view, showing important details of the modified form.
Figure 10:
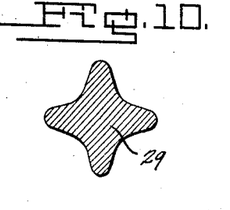
Figure 10 is a cross sectional view of a detail of the preferred form of the invention.

Referring to the modified type of differential as illustrated in Figures 7, 8. and 9, a drum 80 is provided, as a part of the clutch arrangement J, which includes outer and inner annular flanges 81 and 82 respectively, concentrically mounted with respect to the drive shaft G upon the driven member H. The inner flange 82 is provided with a circumferential slot 84 entirely thereabout, and transversely therethrough, which construction can be effected by reason of the fact that the drum 80 is of a two part construction, including a part 85 which is directly attached by the rivets 86 to the driven member H, and an L-shaped part 87, which is attached by rivets 88 or the like to the part 85. A sleeve 89 may be keyed, as at 90, to the shaft G within the drum 80; said sleeve 89 having arms 91 pivotally connected as at 92ⁿ circumferentially thereabout. The arms 91 extend radially through the slot 84 of the inner drum flange 82, and are each pivotally provided with a concavo-convex clutch shoe segment 92. The proximate ends of adjacent clutch shoes 92 are provided with attaching springs 93, normally under compression, so that the linings 95 upon the concaved sides of the shoes 92 are normally held in engagement with the outer surface of the inner flange 82. Thus, the shoes 92 are arranged in ring like formations about the outer surface 96 of the inner flange 82.

Referring to the shifting device K of the modified form of invention, the same includes a casing 100, which is fixedly mounted upon a stationary housing 101 provided for the drive shaft G. A clutch device 102 is provided for cooperation within the drum 80, and which includes a plate 103 freely mounted for oscillation upon the drive shaft G, having radial slots 104 inwardly from one side 105 thereof, said slots being provided for receiving stem ends 106 of each of the arms 91. The stems 106 are provided upon each arm 91 intermediate the outer ends thereof, and are provided with nuts 107 adapted for sliding in enlarged portions 108 of the slots 104, whereby the stems 106 may be attached in said slots of the plate 103 against liability of accidental detachment. A plate 110 is also provided as a part of the clutch device 102, having detachable pins 111 associated therewith and extending from one side thereof for reciprocation through the socket openings 112 of the stationary casing 100. Thus, the plate 110 while slidably mounted for longitudinal movement with respect to the drive shaft G, is prevented, by reason of said pins 111, from rotational movement about said drive shaft G. Springs 114 are preferably provided upon each of the pins 111 cooperating intermediate the heads 115 thereof and the partition portion 116 of the stationary casing 100, whereby the plate 110 is normally held out of frictional engagement with the lined face 118 of the plate 103. Suitable bell crank levers 119 are rockably provided on the stationary casing 100, having rods or like elements 120 pivotally provided thereon for operation of said levers 119, whereby the pins 111 may be depressed into the drum 80 for forcing the clutch plate 110 into engagement with the clutch plate 103.

In operation of this modified form of invention, for forward driving of the wheel H, the arms 91 will be positioned by reason of the rotation of the drive shaft G so that the same will exert a pulling action upon the clutch shoes 92. Due to the fact that said clutch shoes 92 are normally held into engagement with the inner flange 82 of the drum 80 by means of the springs 93, it is obvious, that such fact, together with the pulling action exerted by the drive shaft G will result in the drive being transmitted to the drum 80 for rotation of the driven member H forwardly. Assuming it is desired to reverse the drive of the member H, it is necessary for the operator to reverse the drive of the axle G and throw the plates 110 and 103 into engagement. By such action, the stems 106 of the arms 91 are slidably pivoted to the plate 103 so that the reverse drive of the axle G may be immediately transmitted to said arms 91 for rocking them upon their stems 106, so that the tangential inclination of said arms 91 may be properly changed, for locking of the clutch shoes 92 with the inner flange 82 for reverse drive of the member 80. As is illustrated in Figure 9, the arms 91 are shown in radial position, which denotes the manner in which the clutch shoes 92 and arms 91 are positioned during a shifting operation.

From the foregoing, it can be seen that two forms of improved differential gearing have been provided, which may be used in connection with automotive vehicles, although the use of the same is not so restricted. The preferred form of invention utilizes the connecting arms 29 and 30 thereof in transmitting a pushing action to the clutch shoes 32 and 33 for forcing them into engagement with the drum 20. On the other hand, the modified form of invention shows the manner in which arms 91 may be provided for transmitting a pulling action so that clutch shoes 92 may be held into engagement with a drum 80. The improved mechanism may be mounted upon the inside or outside of the driven wheels as desired. In lieu of the flat plate clutch devices 58 and 102 of the preferred and modified forms of shifting devices, cone clutch arrangements may be substituted for effecting the purpose for which they are provided.

Various changes in the shape, size, arrangement of parts, and substitution of equivalents may be made to the forms of invention herein shown and described, without departing from the spirit of the invention or the scope of the claims.

I claim:

1. A device of the class described comprising a drive member, clutch shoes arranged in sets, arms tangentially pivoted to said drive member and inclining in one direction peripherally thereof for supporting one set of clutch shoes, and a second set of arms tangentially pivoted to said drive member to incline in a direction opposite to the inclination of said first mentioned arms for supporting said second set of shoes in a different plane from the first mentioned set of shoes.

2. A device of the class described comprising a drive member, a drum, clutch shoes arranged in sets, arms tangentially pivoted to said drive member and inclining in one direction peripherally thereof for supporting one set of clutch shoes, a second set of arms tangentially pivoted to said drive member to incline in a direction opposite to the inclination of said first mentioned arms for receiving a second set of shoes, so that adjacent arms of different sets are disposed in crossed relation, and a link pivotally connecting the ends of the arms in crossed relation, whereby said arms may be moved for selectively positioning either of the sets of clutch shoes in engagement with said drum.

3. In a device of the class described, the combination of a drive member, a driven member, clutch shoes, arms pivotally connected at an end of each to said drive member, and pivotally connected at an end of each to said clutch shoes, and a link member pivotally connecting the ends of said arms adjacent their pivotal connections with said clutch shoes.

4. In a device of the class described, the combination of a drive member, a drum, a pair of clutch shoes, a pair of arms having an end of each tangentially pivoted to said drive member and disposed in adjacent relation to be pivotally connected at an end of each to said clutch shoes, a link pivotally connecting said arms adjacent their connections with said clutch shoes, a casing stationary with respect to said drive member, a clutch device comprising a member oscillatively mounted on said drive member having a slot therein, a second member slidable longitudinally of said drive member, fixed upon said stationary casing for longitudinal sliding with respect to said drive member and prevented from oscillative movement with respect thereto, an attachment pivoted with respect to said drive member having an end slidable in the slot of said clutch device oscillating member, and a spring engaging the other end of said attachment and connecting the same to one of said arms adjacent the link.

5. A device of the class described, comprising a drive shaft, a driven member, a drum attached to said driven member, a sleeve attached in fixed relation to said drive shaft, arms pivotally connected to said sleeve in sets peripherally thereof, segmental clutch shoes adapted for cooperation with said drum pivotally connected in sets to the said sets of arms, fixed arms radially disposed upon said sleeve, attachments pivotally connected upon the ends of said sleeve arms, including springs connected to the arms of one set of clutch shoes, links pivotally connected upon one set of clutch shoe arms to hold the other set of clutch shoe arms in determined relation thereto, and means for shifting of said attachments so that the springs thereof may selectively hold one of said sets of clutch shoes in engagement with said drum, and hold the other set out of engagement with said drum, whereby said driven member may be operated for forward or reverse driving by said drive shaft.

6. A differential mechanism comprising a drive shaft, a driven member, a pair of expansible clutch shoe devices for connection of the drive shaft to said driven member to impart movement of the former to the latter, means connecting said pair of expansible clutch shoe structures for mutual cooperation whereby one of said shoes may connect the drive shaft to the driven member for forward drive, and the other for reverse drive, a supporting arrangement fixed upon said drive shaft, operating levers oscillatively carried by said support arrangement, springs connecting said levers to said sets of expansible clutch shoes, and means for operating said levers whereby the springs thereof may be utilized in selective manner for maintaining either of the clutch shoes in position for operation of said driven member by said drive shaft.

7. A differential mechanism comprising a drive shaft, a driven member, a drum supported by the driven member, a clutch shoe structure supported by the drive shaft for cooperation within the drum of the driven member whereby the latter may be driven according to the directional drive of the drive shaft, and an operating clutch device including a plate oscillatively supported by the drive shaft having radial slots therein, means connecting said clutch shoe structure in the radial slots of said plate, said means being adapted for longitudinal sliding in said slots, a plate longitudinally slidable upon the driven shaft mounted against rotation thereon, and means for advancing said plate longitudinally of the drive shaft into engagement with said first mentioned plate whereby the latter may be maintained in position for operating said clutch shoe structure.

EDWARD M. BELL.